United States Patent
Wang et al.

(10) Patent No.: US 7,747,061 B2
(45) Date of Patent: Jun. 29, 2010

(54) METHOD AND APPARATUS FOR ANY WHICH WAY CHECK ACCEPTANCE

(75) Inventors: Jimmy Wang, Alamo, CA (US); Steve Hatzirallis, San Francisco, CA (US); Jonathan Velline, Oakland, CA (US); Elizabeth Ann Schrag, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 797 days.

(21) Appl. No.: 11/608,730

(22) Filed: Dec. 8, 2006

(65) Prior Publication Data

US 2008/0137939 A1   Jun. 12, 2008

(51) Int. Cl.
*G06K 9/00* (2006.01)
*G06Q 40/00* (2006.01)

(52) U.S. Cl. ............... 382/137; 382/321; 705/40
(58) Field of Classification Search ................ 382/100, 382/101, 102, 112–116, 119, 135, 136, 137, 382/138, 139, 140, 156, 168, 175–178, 181–189, 382/199, 209, 214, 232, 254, 274, 276, 286–292, 382/305, 312, 321; 235/380, 379; 463/42; 705/40

See application file for complete search history.

(56) References Cited

U.S. PATENT DOCUMENTS 5,220,501 A * 6/1993 Lawlor et al. ............... 705/40
5,963,647 A * 10/1999 Downing et al. ............ 705/39
6,131,809 A 10/2000 Drescher
6,164,638 A 12/2000 Owens
6,170,818 B1 1/2001 Eastman et al.
6,202,054 B1 3/2001 Lawlor
6,241,244 B1 6/2001 Modi (Continued)

FOREIGN PATENT DOCUMENTS

EP   0504287 B1   7/1999

(Continued)

OTHER PUBLICATIONS

*ATM Forum Targets User Needs and Desktop Applications*; Broadband Networking News, v 6, n 18, p. N/A; Sep. 3, 1996.

(Continued)

*Primary Examiner*—Seyed Azarian
(74) *Attorney, Agent, or Firm*—Merchant & Gould P.C.

(57) ABSTRACT

An Any Which Way Check Acceptance method and apparatus is provided, which allow a set of checks to be deposited in a stack, where each check can be oriented in any of sixteen different ways. In one embodiment of the invention, the ATM check reader has an MICR and OCR scanner/reader. When a set of checks is deposited, each check is subjected to a MICR scan and an OCR scan. If the check is aligned correctly and right side up, then the check is processed based on the MICR scan information. If the check is not aligned correctly or is upside down, then the MICR read fails because the magnetic stripe on the check is not where it is expected to be. Rather than rejecting the check at this point, the invention uses the OCR scan information from both the front and back of the check to process the check.

2 Claims, 6 Drawing Sheets

U.S. PATENT DOCUMENTS

| | | |
|---|---|---|
| 6,264,101 B1 | 7/2001 | Ryan et al. |
| 6,290,070 B1 | 9/2001 | Graef |
| 6,302,393 B1 | 10/2001 | Beskitt |
| 6,318,714 B1 | 11/2001 | Beskitt |
| 6,328,207 B1 | 12/2001 | Gregoire |
| 6,331,000 B1 | 12/2001 | Beskitt |
| 6,394,907 B1 | 5/2002 | Rowe |
| 6,474,548 B1 | 11/2002 | Montross |
| 6,520,408 B1 | 2/2003 | Force et al. |
| 6,554,185 B1 | 4/2003 | Montross |
| 6,607,081 B2 | 8/2003 | Graef |
| 6,659,341 B1 | 12/2003 | Wang |
| 6,682,068 B1 | 1/2004 | Haney et al. |
| 6,726,097 B2 * | 4/2004 | Graef et al. .................. 235/379 |
| 6,745,939 B2 | 6/2004 | Force |
| 6,866,586 B2 * | 3/2005 | Oberberger et al. ........... 463/42 |
| 6,941,274 B1 * | 9/2005 | Ramachandran et al. ...... 705/26 |
| 6,983,880 B2 | 1/2006 | Graef |
| 6,988,656 B2 * | 1/2006 | Scarafile et al. ............. 235/379 |
| 7,032,245 B2 * | 4/2006 | Scarafile et al. ............. 235/380 |
| 7,494,052 B1 * | 2/2009 | Carpenter et al. ........... 235/379 |
| 2002/0011431 A1 | 1/2002 | Graef |
| 2002/0038289 A1 | 3/2002 | Lawlor |
| 2003/0061132 A1 | 3/2003 | Ku, Sr. |
| 2003/0196936 A1 | 10/2003 | Graef |
| 2003/0201318 A1 | 10/2003 | Graef |
| 2004/0064414 A1 | 4/2004 | Silverbrook |
| 2004/0089711 A1 | 5/2004 | Sandru |
| 2004/0212141 A1 | 10/2004 | Graef |
| 2004/0212142 A1 | 10/2004 | Graef |
| 2004/0215564 A1 | 10/2004 | Lawlor |
| 2004/0222295 A1 | 11/2004 | Magee |
| 2004/0245333 A1 | 12/2004 | Kraft |
| 2005/0040225 A1 | 2/2005 | Csulits |
| 2005/0139671 A1 | 6/2005 | Beichler et al. |
| 2005/0244932 A1 | 11/2005 | Harding |
| 2005/0258234 A1 | 11/2005 | Silverbrook |
| 2005/0258235 A1 | 11/2005 | Silverbrook |
| 2005/0279822 A1 | 12/2005 | Douglass |
| 2006/0024690 A1 | 2/2006 | Kao |
| 2006/0024831 A1 | 2/2006 | Kao |

FOREIGN PATENT DOCUMENTS

| | | |
|---|---|---|
| EP | 0960499 B1 | 11/2005 |
| WO | WO91/09370 | 6/1991 |
| WO | WO97/04411 | 2/1997 |
| WO | WO01/03012 A1 | 6/2000 |
| WO | WO01/80145 A2 | 10/2001 |

OTHER PUBLICATIONS

Edwards, C.; *Optical Format to Wait for 90nm*; Electronic Engineering Times UK; Sep. 9, 2002.

McKenney, J.L. et al.; *Bank of America: The Crest and Trough of Technological Leadership*; MIS Quarterly v21n3 pp. 321-353; Sep. 1997.

Shan, T.C. et al.; *Service Oriented Solution Framework for Internet Banking*; International Journal of Web Services Research v3n1 pp. 29-48; Jan.-Mar. 2006.

Stack, J.; *Comment: Banks Losing Out in 'Money Revolution'*; American Banker —Aug. 27, 1999; p. 6; vol. 164, No. 165.

Totty, P.; *ATMs in Overdrive*; Credit Union Magazine v71n6 pp. 68-72; Jun. 2005.

Verma, R. et al.; *Redesigning Check-Processing Operations Using Animated Computer Simulation*; Business Process Management Journal v6n1 pp. 54; 2000.

* cited by examiner

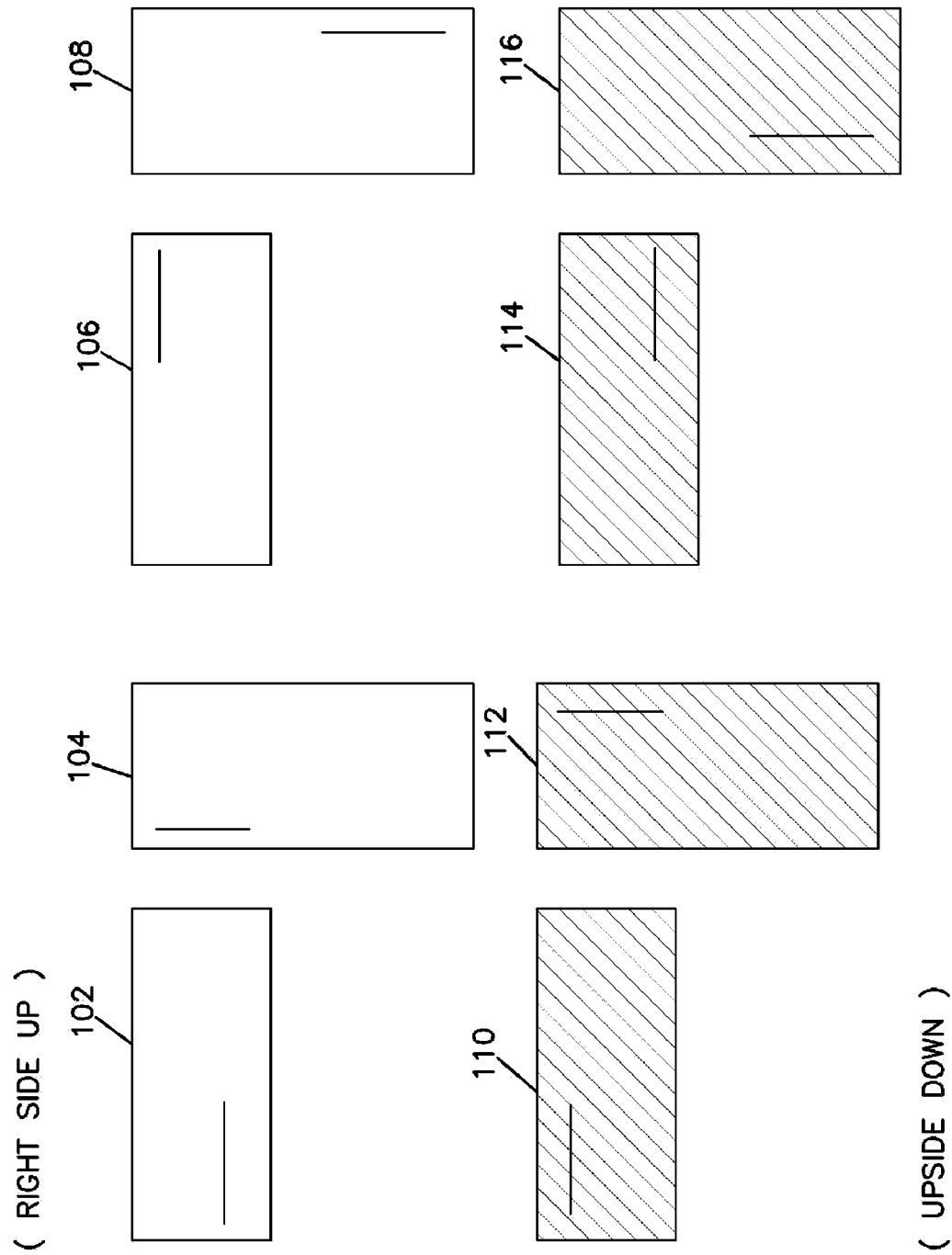

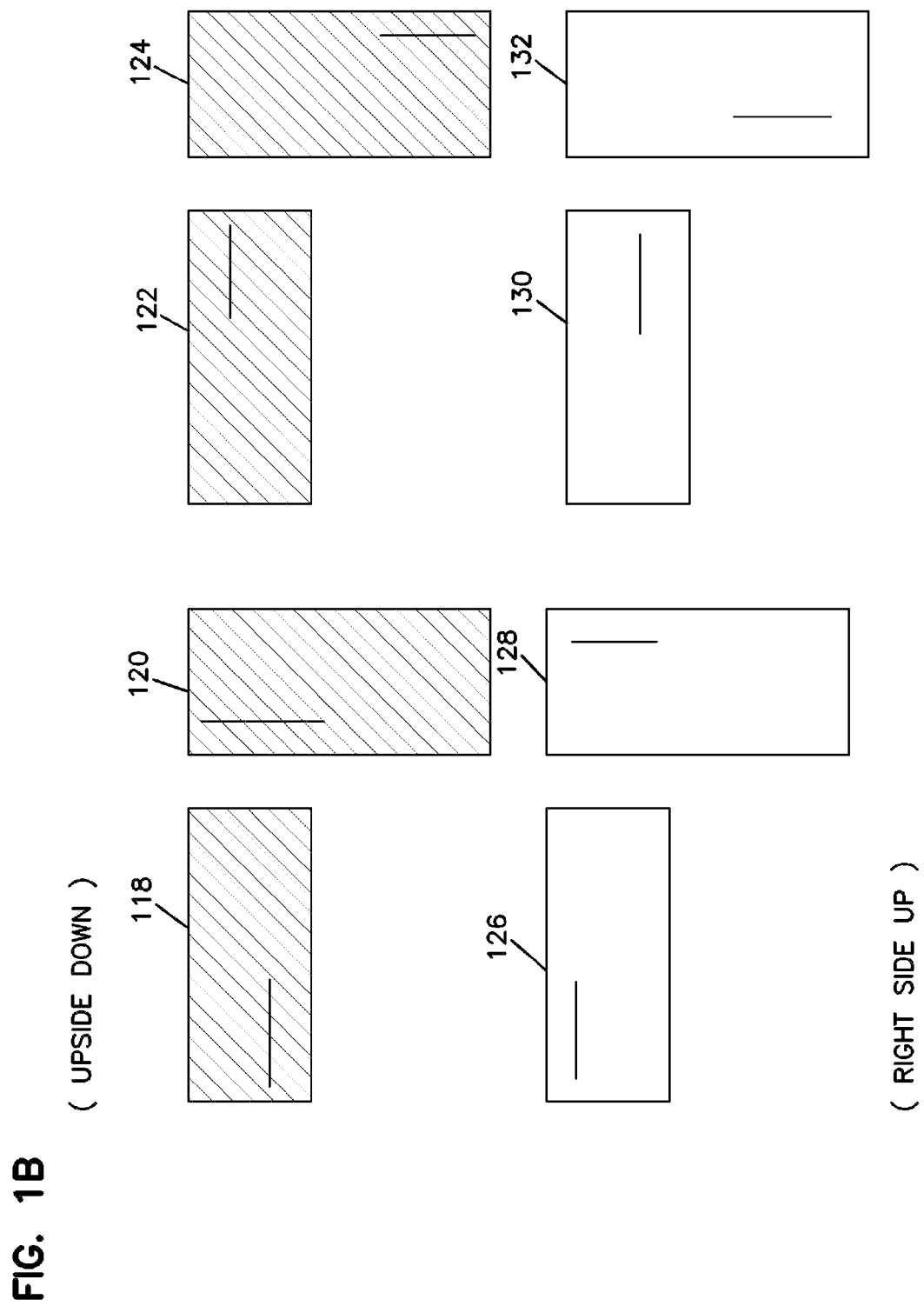

FIG. 2
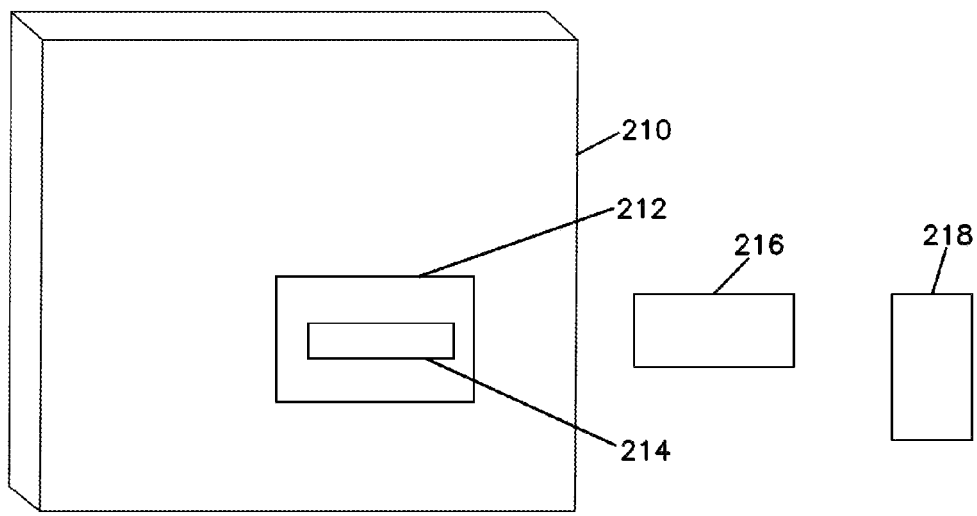
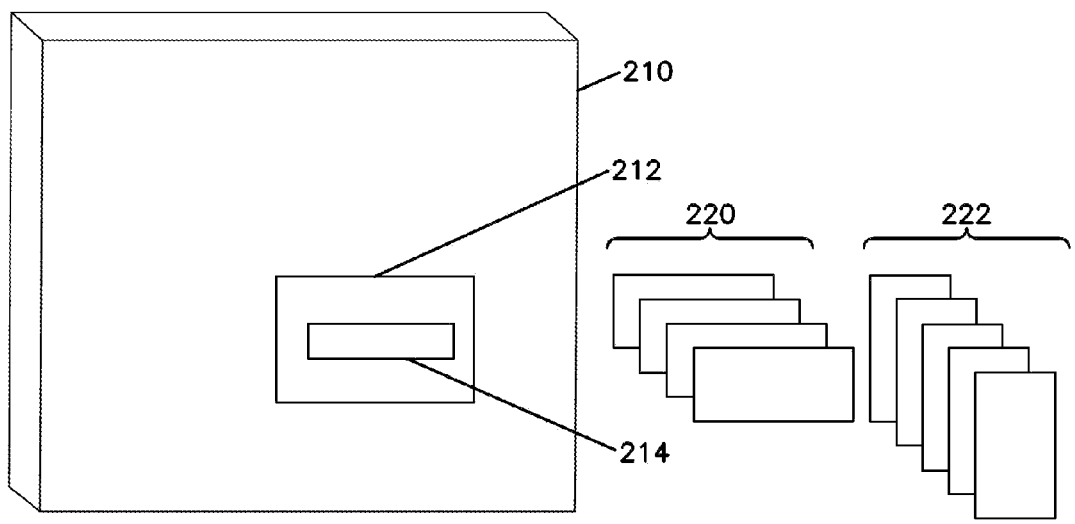

METHOD AND APPARATUS FOR ANY WHICH WAY CHECK ACCEPTANCE

BACKGROUND OF THE INVENTION

1. Technical Field

The invention relates generally to check processing. More particularly, the invention relates to a method and apparatus for a check reader to process checks that are not aligned correctly or are upside down.

2. Description of the Prior Art

Check depositing in automated banking machines are known in the prior art. Automatic banking machines are used to carry out transactions of value. A popular type of automated banking machine is an automated teller machine (ATM). Other types of automated banking machines are used to count and dispense cash. These machines are often used by tellers or customer service representatives in banking and other transaction environments. Other types of automated banking machines are used to make or receive payments, to dispense or receive tickets, travelers checks, scrip, cash, or other documents or items of value, or to electronically check or transfer funds.

Some ATM machines have the capability of receiving checks and other negotiable instruments. Such machines may include a device such as is shown in U.S. Pat. No. 5,422,467. Devices of this type can be used to cancel and produce electronic images of checks which are deposited into an ATM machine. The canceled checks are stored in the machine for later removal by bank personnel.

While such automated banking machines have been available for awhile and have experienced improvements, there still are some drawbacks. There still is not available a convenient and efficient technique for allowing an entire stack of checks to be deposited, regardless of the orientation of each of the checks in the stack.

A discussion on some of the prior art of currency and document orientation and sorting follows. For example, M. Owens, H. T. Graef, J. Eastman, M. Harty, and A. Junkins, U.S. Pat. No. 6,164,638, Automated Banking Machine with Currency Recycling Canisters (Dec. 26, 2000) discuss an automated banking machine identifying and storing documents, such as currency bills deposited by a user. The machine then selectively recovers such documents from storage and dispenses them to other users. The machine includes a central transport wherein documents deposited in a stack are unstacked, oriented, and identified. Such documents are then routed to particular storage areas in recycling canisters. When a user subsequently requests a dispense, documents stored in the storage areas are selectively picked therefrom and delivered to the user through an input/output area of the machine.

As another example, M. Force, T. H. Graef, R. Bowser, J. Eastman, M. Harty, A. Junkins, M. E. Lindroos, M. Owens, M. Ryan, A. Looney, and R. Shirah, U.S. Pat. No. 6,745,939, Method of Operating a Self-Auditing Automated Banking Machine (Jun. 8, 2004) similarly discuss an automated banking machine that identifies and stores documents such as currency bills deposited by a user. The machine selectively recovers stored documents and dispenses them. The machine includes a central transport wherein documents deposited in a stack are unstacked, oriented, and identified. Such documents are then routed to storage areas in. Documents in the storage areas are selectively picked therefrom and delivered to a user. Each canister includes a memory which holds information concerning the number and type of documents housed in the canister as well as other information concerning the hardware and software resident on the canister. The memory also includes data representative of individuals responsible for loading and transporting the canister. The machine conducts self-auditing activities to verify that the documents held in the storage areas correspond to the information stored in memory and indicate discrepancies.

In a third example, D. C. McGlamery, K. G. Harrington, R. M. Parsons, and R. G. Belchler, U.S. 2005/0139671, Method and System for Exception Processing of MICR Documents (Jun. 30, 2005) discuss a system and method for exception processing of MICR documents. MICR documents are read and sorted to a destination pocket for processing subject to a determination that an exception does not prevent the routing of the document. In example embodiments, for example, an error does not prevent the routing of the document if it is not related to the routing/transit field. In the case of digit errors, an optical character recognition (OCR) process is performed on the stored, electronic image of the document to correct digit errors in the stored data read from the documents. If a determination is made that correction or other exception processing cannot be handled through the OCR process, the image and corresponding MICR data is displayed on a user terminal, for manual verification or correction by reference to an image of the document, rather than the document itself.

As can be gleaned from the above, while there has been some development and progress in the handling of recycling currency or other sheets or documents representative of value received from a customer, or MICR line exception processing, such teachings nevertheless still lack the contemplation of allowing a set of checks to be deposited as a stack where each check can be oriented in sixteen different ways, without having to later re-orient any check.

It would therefore be advantageous to allow a set of checks to be deposited as a stack where each check can be oriented in sixteen different ways without having to later re-orient any check.

SUMMARY OF THE INVENTION

A method and apparatus for an Any Which Way Check Acceptance technique is provided. The method and apparatus allow a set of checks to be deposited as a stack, where each check can be oriented in any of sixteen different ways. In this way customers can deposit checks without worrying if the magnetic ink character recognition (MICR) line is on the top and aligned on the right. In one embodiment of the invention, the automated teller machine (ATM) check reader has an MICR and optical character recognition (OCR) scanner/reader. When a set of checks is deposited, each check is subjected to an MICR scan and an OCR scan. If the check is aligned correctly and right side up, then the check is processed based on the MICR scan information. If the check is not aligned correctly or is upside down, then the MICR read fails because the magnetic stripe on the check is not where it is expected to be. Rather than rejecting the check at this point, the invention uses the OCR scan information from both the front and back of the check to process the check.

BRIEF DESCRIPTION OF THE DRAWINGS

FIGS. 1A-1B are schematic diagrams of sixteen possible orientations for inputting a check into an Any Which Way Check Acceptance receptacle, according to the invention;

FIG. 2 is a schematic diagram of an example automated banking machine accepts a rectangular check oriented widthwise or lengthwise, according to the invention;

DETAILED DESCRIPTION OF THE INVENTION

Figure 3:
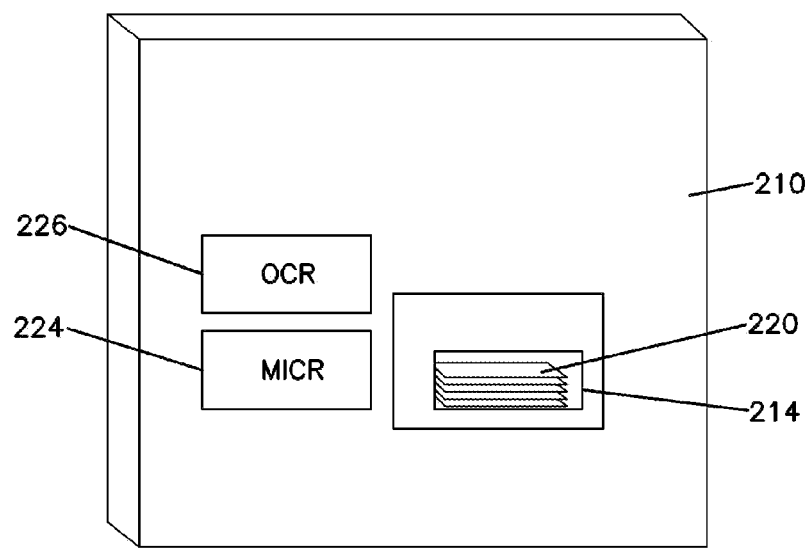
FIG. 3 is a schematic diagram of the example automated banking machine of FIG. 2 where a widthwise stack of checks is deposited into the receptacle interface, according to the invention.

A method and apparatus for an Any Which Way Check Acceptance technique and mechanism is provided. The method and apparatus allow a set of checks to be deposited in a stack, where each check can be oriented in any of sixteen different ways. In this way customers can deposit checks without worrying if the magnetic ink character recognition (MICR) line is on the top and aligned on the right. In one embodiment of the invention, the automated teller machine (ATM) check reader has an MICR and optical character recognition (OCR) scanner/reader. When a set of checks is deposited, each check is subjected to a MICR scan and an OCR scan. If the check is aligned correctly and right side up, then the check is processed based on the MICR scan information. If the check is not aligned correctly or is upside down, then the MICR read fails because the magnetic stripe on the check is not where it is expected to be. Rather than rejecting the check at this point, the invention uses the OCR scan information from both the front and back of the check to process the check.

FIGS. 1A-1B show a schematic diagram of sixteen possible orientations for inputting a check into an Any Which Way Check Acceptance receptacle, according to the invention. It should be appreciated that the images are by way of example only. One skilled in the art is not limited to the rectangular shape of the check form in this example or the sixteen variations in orientation in this example. Eight of the sixteen orientations of an example rectangular check are shown in FIG. 1A. Blocks 102-108 represent checks that are right side up, starting with the MICR line positioned at the bottom-left area of the check 102. Each subsequent check, 104, 106, and 108, show three possible orientations, each arrived at by rotating the previous check by 90 degrees clockwise. Block 110 represents a check with an orientation arrived at by flipping over check 102 so that it is upside down. It should be appreciated that the MICR line of check 110 is positioned at the top left hand corner. Each subsequent check, 112, 114, and 116, show three possible orientations, each arrived at by rotating the previous check by 90 degrees clockwise. In FIG. 1B, blocks 118-124 represent checks that are upside down. The MICR line in check 118 is positioned at the bottom-left area. Each subsequent check, 120, 122, and 124 show three possible orientations, each arrived at by rotating the previous check by 90 degrees clockwise. Block 126 represents a check with an orientation arrived at by flipping over check 118 so that it is right side up. It should be appreciated that the MICR line of check 126 is positioned at the top left hand corner. Each subsequent check, 128, 130, and 132, show three possible orientations, each arrived at by rotating the previous check by 90 degrees clockwise.

FIG. 2 shows a schematic diagram of an example automated banking machine 210, such as an ATM, that has an input check receptacle 212 with a receptacle interface 214, that can accept a rectangular check oriented widthwise 216 or lengthwise 218. It should be appreciated that the checks can be input into the receptacle interface either right side up or upside down. For illustrative purposes, FIG. 2 also shows a stack of checks that are to be input into the receptacle interface 214 oriented either widthwise 220 or lengthwise 222.

FIG. 3 shows a schematic diagram of the example automated banking machine 210 where the widthwise stack of checks 220 was input into the receptacle interface 214. One embodiment of the check reader has a MICR and an OCR scanner/reader, which are shown symbolically in FIG. 3 as components 224 and 226, respectively. It should be appreciated that the embodiment shown in FIG. 3 is by way of illustration only and is not meant to be limiting. One skilled in the art can readily appreciate that the MICR and OCR scanner/readers can reside on a same device, or can be run remotely, as in a client-server architecture, and so on. According to one embodiment of the invention, when the set of checks 220 is deposited, each check is subjected to a MICR scan 224 and an OCR scan 226.

Figure 4:
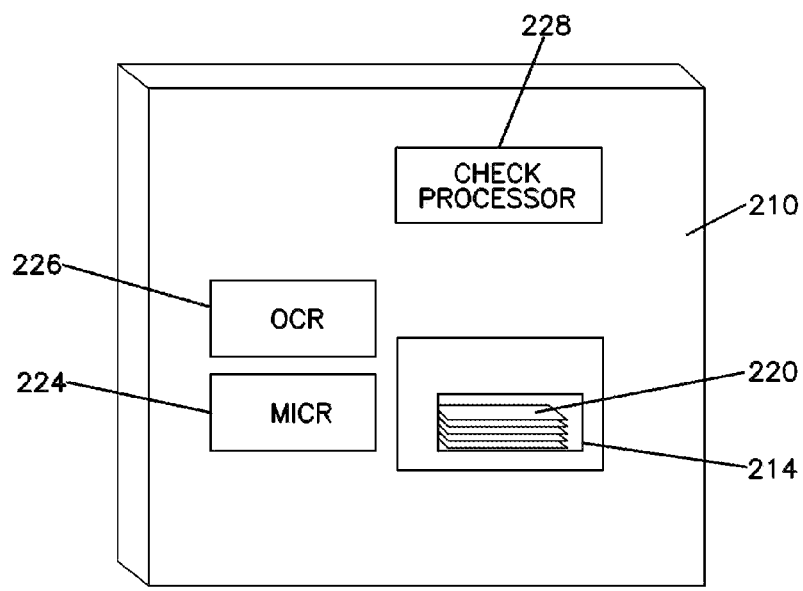
FIG. 4 is a schematic diagram of the example automated banking machine of FIG. 3 with a check processor, according to the invention.

FIG. 4 shows a schematic diagram of the example automated banking machine 210 of FIG. 3, but also shows a check processor 228. According to one embodiment of the invention, after each check has been processed by the MICR scanner/reader 224 and after each check has been processed by the OCR scanner/reader 226, the check processor 228 uses the scanned and read information as follows: If the check is aligned corrected and right side up, then processor processed the check based on the MICR scan information; if the check is not aligned correctly or is upside down, then the MICR read will fail because the Magnetic Stripe on the check is not where it is expected to be. Rather then rejecting the check at this point, the OCR scanned and read information is used to process the check. It should be appreciated that in one embodiment of the invention, the OCR scanner/reader gathers information from both the front and the back of the check.

Figure 5:
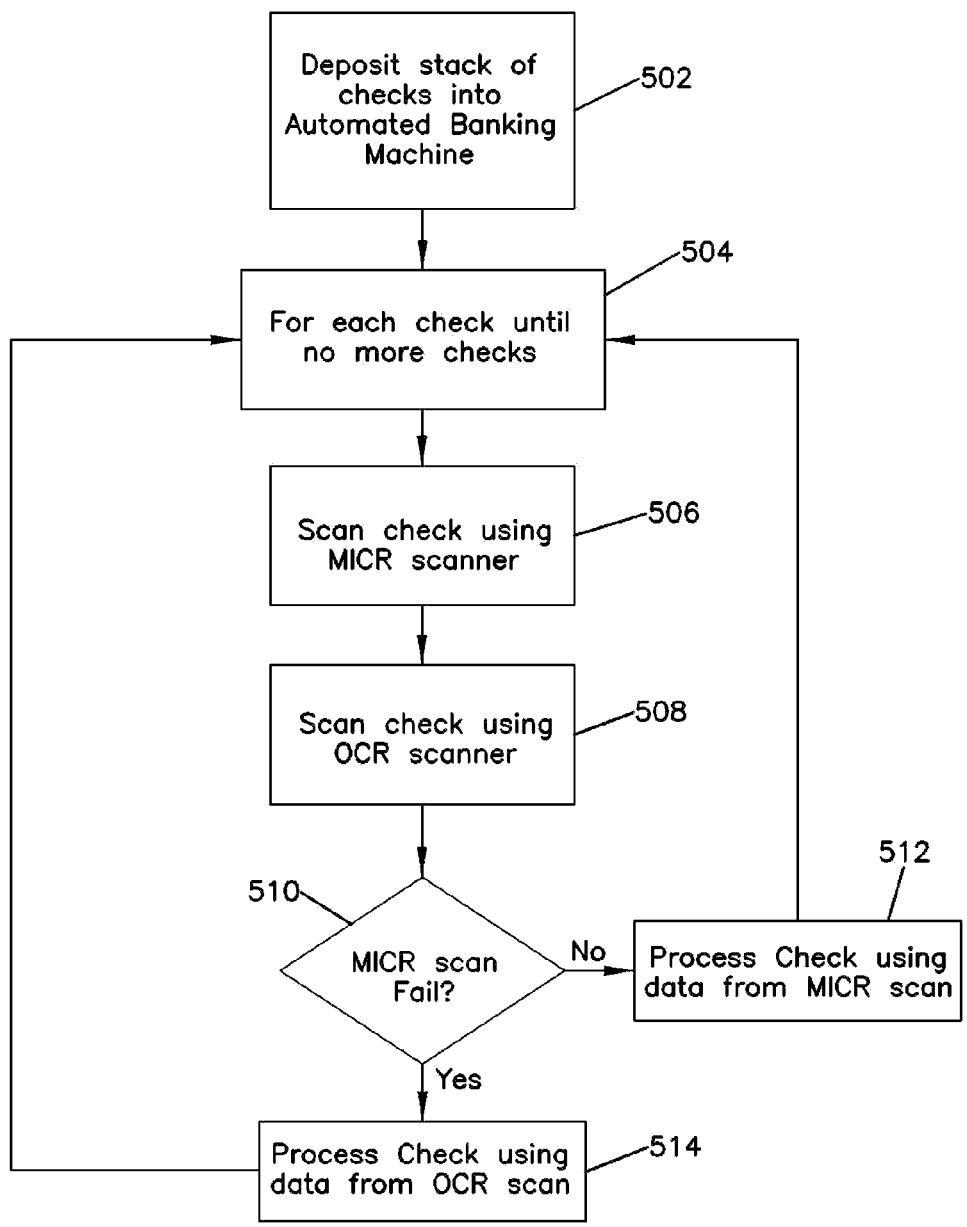
FIG. 5 is a high level flow diagram of check processing according to the invention.

FIG. 5 shows a flow diagram at a high level of check processing according to one embodiment of the invention. One skilled in the art can appreciate that this particular flow is meant by way of example only and variations on the flow can be implemented without departing from the spirit and scope of the invention. A stack of checks is deposited into an Automated Banking Machine (502), such as, for example, an ATM. For each check of the stack until there are no more checks (504), a MICR scanner scans the check (506) and an OCR scanner scans the check (508). The OCR scanner is adapted to scan both sides of the check, thereby capturing informational data from both sides of the check. The process determines whether or not the MICR scan fails (510). If the MICR scan did not fail, then the check is processed based on the data obtained from the MICR scan (512) and the process returns to step (504) where either the next check is processed or the algorithm ends. If the MICR scan did fail, then the check is processed based on the data obtained from the OCR scan (514) and the process returns to step (504) where either the next check is processed or the algorithm ends.

Alternate Embodiments

In one embodiment of the invention, the step of determining whether or not the MICR scan failed is performed before an OCR scan. In this way, if the MICR scan is successful, then check is processed using the MICR scanned data.

It can be appreciated that the MICR scanner and the OCR scanner are separated conceptually in the example above, and that depending on certain technologies, the MICR scanning and the OCR scanning process can be performed by a single apparatus.

It can be appreciated that none of the components is confined to any machine and can be run on a host or remotely, depending on a given architecture the design of which is driven by business requirements.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer implemented method for processing a stack of one or more checks regardless of orientation, comprising the steps of:

depositing a stack of one or more checks into an automated banking machine, each check having a magnetic ink character recognition (MICR) line, regardless of orientation with respect to said MICR line of any of said checks, such that each check can be deposited in sixteen different orientations, based on positioning of the MICR line; and performing the following steps for each check:
    scanning said check using a MICR scanner;
    scanning both sides of said check using an OCR scanner;
determining if said step of scanning using said MICR scanner failed;
processing said check using scanned data obtained from said MICR scan if said MICR scanning did not fail and going to step of ending process if no more checks;

processing said check using scanned data obtained from said OCR scan if said MICR scanning failed and going to step of ending process if no more checks;
and ending process if no more checks.

2. A system on a computer network for processing a stack of one or more checks regardless of orientation, comprising:

means for depositing a stack of one or more checks into an automated banking machine, each check having a magnetic ink character recognition (MICR) line, regardless of orientation with respect to said MICR line of any of said checks, such that each check can be deposited in sixteen different orientations, based on positioning of the MICR line; and means for performing a process algorithm for each check comprising the following:

means for scanning said check using a MICR scanner;
    means for scanning both sides of said check using an OCR scanner;
    means for determining if means for scanning using said MICR scanner failed;
    means for processing said check using scanned data obtained from said MICR scan if said MICR scanning did not fail and going to control to means for ending process if no more checks;
    means for processing said check using scanned data obtained from said OCR scan if said MICR scanning failed and going to control to means for ending process if no more checks; and Means for ending process if no more checks.

\* \* \* \* \*